United States Patent [19]

Cole

[11] Patent Number: 4,753,402
[45] Date of Patent: Jun. 28, 1988

[54] BIASED LEADING EDGE SLAT APPARATUS

[75] Inventor: James B. Cole, King County, Wash.
[73] Assignee: The Boeing Company, Seattle, Wash.
[21] Appl. No.: 814,604
[22] Filed: Dec. 30, 1985
[51] Int. Cl.$^4$ .............................................. B64C 9/24
[52] U.S. Cl. ................................... 244/210; 244/214
[58] Field of Search ............. 244/210, 211, 214, 75 R

[56] References Cited
U.S. PATENT DOCUMENTS

| | | | |
|---|---|---|---|
| 1,780,838 | 11/1930 | Page | 244/210 |
| 1,830,019 | 11/1931 | Davis | 244/210 |
| 2,361,574 | 10/1944 | Tampier | 244/210 |
| 2,406,475 | 8/1946 | Rogers | 244/210 |
| 2,938,680 | 5/1960 | Greene et al. | 244/210 |

Primary Examiner—Joseph F. Peters, Jr.
Assistant Examiner—Rodney Corl
Attorney, Agent, or Firm—Hughes, Cassidy & Multer

[57] ABSTRACT

YAn aircraft leading edge slat is biased when at an extended location toward a first position wherein the trailing edge of the slat is a predetermined distance from the wing upper surface. The slat is pivotable to a second position, when aerodynamic forces acting on the wing overcome the biasing force, wherein the slat trailing edge is pivoted upward and forward, and the distance between the slat trailing edge and the wing upper surface is increased. The slat is retracted and extended by a drive track which is supported inside the wing by upper rollers located chordwise within the wing cavity, a lower front roller, and a pair of roller rings rotatably mounted at opposite sides of a rotary actuator pinion gear. The pinion gear engages the drive track and moves the slat between the extended and retracted positions.

9 Claims, 7 Drawing Sheets

BIASED LEADING EDGE SLAT APPARATUS

TECHNICAL FIELD

The present invention relates to an aircraft wing leading edge slat apparatus, and more particularly to a leading edge slat apparatus biased toward a first position when at an extended position wherein the trailing edge of the slat is in close proximity to the wing upper surface; and further wherein the slat is pivotable at this extended position to a second higher lift position when aerodynamic forces acting on the slat overcome the slat bias so that the slat leading edge is pivoted downward, and the distance between the slat trailing edge and the wing upper surface is increased to open an aerodynamic slot.

BACKGROUND OF THE INVENTION

In order to modify the lift characteristics of an airfoil for low speed operation, leading edge airfoil devices are used on the aircraft wing leading edge to pivot or slide outwardly from the leading edge of the airfoil to a deployed position. Typically, these leading edge slats are moved downward and forward from the wing leading edge. Movement of the slat is caused by a linear actuator between the wing and the slat, or by a rotary actuator which moves a track or arm which is attached to the slat. During extension and retraction of the slat, it is desirable that the location of the trailing edge of the slat remain on or near the upper surface of the wing to prevent air flow turbulence on the wing upper surface and thereby reduce aerodynamic drag.

In certain moderate angle of attack configurations when the slat is fully extended, the trailing edge of the slat is spaced apart from the upper surface of the wing to form a small aerodynamic slot. This slot permits the introduction of high energy air from beneath the wing over the upper surface of the wing. This high energy airflow assists in keeping the airflow attached the upper surface of the wing to maintain the lift capability of the wing at lower aircraft speeds. To maintain wing lift for very low speed, high angle of attack configurations, the slat is rotated to a steeper angle to further increase the distance between the slat trailing edge and the wing upper surface thereby increasing the size of the aforementioned slot and the amount of high energy air available to prevent the wing from stalling.

In conventional leading edge slat apparatus, additional programming tracks are required to rotate the slat to the optimum angle for various medium and high lift configurations. These programming track assemblies are typically quite large and heavy thereby increasing the overall gross weight of the aircraft. In addition, the rate at which the slat is moved into the medium and high lift configurations is limited by the actuator speed.

SUMMARY OF THE INVENTION

The embodiments of the present invention described more fully hereinafter pertain to an aircraft leading edge slat apparatus which may be moved between a retracted position, an intermediate position, and a fully extended position. During movement of the slat between the retracted and intermediate positions, the slat trailing edge is engaged down agains the upper surface of the wing to eliminate airflow between the two surfaces and to reduce the resulting aerodynamic drag. However, during movement of the slat between the intermediate and extended locations, the slat is held in a first extended position by spring bias means. The spring bias means are engaged between a rearward extending biasing arm of the slat and a main drive track which, in cooperation with a rotary actuator, extends and retracts the slat. When aerodynamic forces acting upon the slat are sufficient to overcome the spring bias, the slat leading edge is caused to rotate about its pivot attachment to the main track and open up an aerodynamic slot between the slat trailing edge and wing fixed leading edge. Rotation of the slat in the direction of the fully slotted position is limited by a pin inserted in the main track which engages the end of a slot in the slat biasing arm.

An object of the present invention therefore is to provide a leading edge slat apparatus which will open an aerodynamic slot proportional to the wing angle of attack to prevent the wing from stalling as the airspeed of an aircraft is reduced and the angle of attack is increased.

BRIEF DESCRIPTION OF THE DRAWINGS

These and other objects of the present invention will become more readily apparent upon reading the following detailed description and upon reference to the attached drawings in which.

While the present invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the invention is to cover all modifications, equivalents and alternatives falling within the spirit and scope of the invention as expressed in the appended claims.

DETAILED DESCRIPTION OF THE INVENTION

Figure 1:
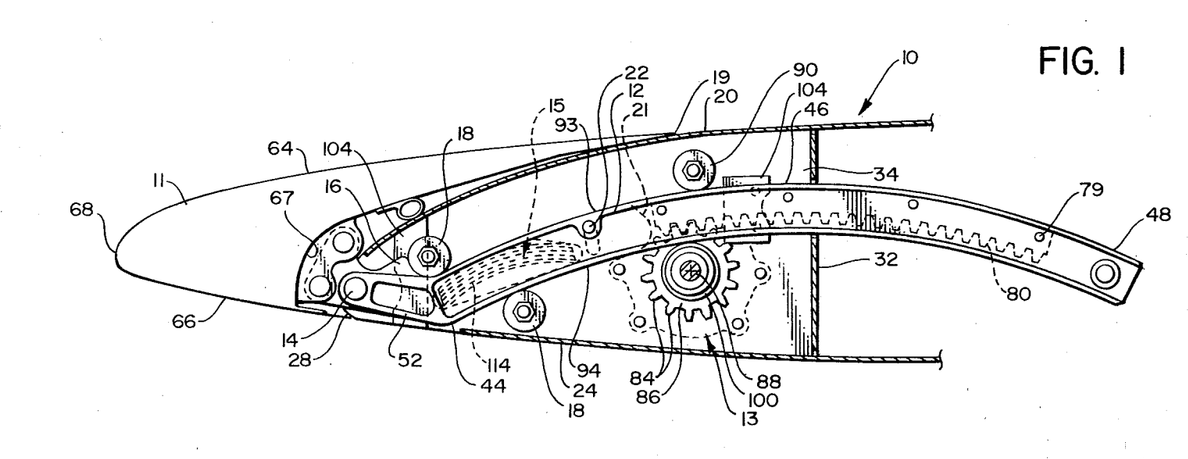
FIG. 1 is a side sectional view of an aircraft wing incorporating the leading edge slat apparatus of the present invention and showing the slat in a retracted position.

Referring to FIG. 1, the principal elements of the present invention and their operation will be discussed first, followed by a more detailed description. The present invention broadly includes a forward portion of a wing, indicated at 10, which is connected to a leading edge slat 11 by means of a main support track 12. Extension of slat 11 between a retracted location shown in FIG. 1, via an intermediate location shown in FIG. 2, to a fully extended location shown in FIG. 3 is caused by rotation of a rotary actuator assembly, indicated at 13, which engages and moves main track 12 downward and forward when extending slat 11, and upward and rearward when retracting slat 11, Slat 11 is connected to main track 12 by a pivot connector 14 so that aerodynamic forces acting against slat 11 cause it to pivot in a counterclockwise direction when viewing FIGS. 2 and 3, from a first extended position shown in FIG. 3 to a second extended higher lift position shown in FIG. 6. Spring biasing means indicated at 15 (FIG. 3) are connected between the main track 12 and a rearwardly extending slat biasing arm 16 so as to urge slat 11 in a clockwise direction toward the first extended position. During movement of slat 11 (FIG. 1) between the retracted and intermediate locations, slat biasing arm 16 is locked and prevented from rotating relative to main track 12 by rollers 18 located in a forward portion of wing 10. This ensures that a trailing edge 19 of slat 11 is slidably engaged against an upper surface 20 of wing 10 to produce an aerodynamic seal between slat 11 and wing 10. During extension and retraction of slat 11 between the intermediate and extended locations, a distal end 21 (FIG. 3) of arm 16 is located forward of rollers 18. At this location slat biasing arm 16 is unlocked, but is biased into alignment with main track 12 by means of stacked leaf springs 15. This has the effect of proportioning the size of a slot formed between trailing edge 19 and wing upper surface 20 relative to the aerodynamic forces imposed on slat 11 as it travels between the intermediate position and the fully extended position. When slat 11 is located between the intermediate position and the fully extended position and when aerodynamic loads acting upon slat 11 overcome the spring bias, such as when the angle of attack of the wing increases, slat 11 rotates in a counterclockwise direction from the first extended position to the second higher lift extended position, thereby increasing the camber of the wing/slat airfoil as well as increasing the size of the slot between trailing edge 19 and wing upper surface 20. The amount of rotation of slat 11 to the second higher lift position is limited by pin member 22 (FIG. 8) inserted in main track 12 and slidably engaged within a slot 23 of slat biasing arm 16.

Proceeding now with a more detailed description of the present invention, a fixed leading edge portion of wing 10 (FIG. 1) includes upper surface 20 and a lower surface 24 joined at a leading edge 28, and joined at the rear by a front spar 32 extending spanwise within wing 10 and extending vertically between wing upper surface 20 and wing lower surface 24. Upper surface 20, lower surface 24 and wing spar 32 form a wing cavity 34.

Located inside wing cavity 34 is actuator assembly 13 which is rotatably engaged to main track 12. Main track 12 includes a forward portion 44, a middle portion 46 and a rear portion 48 which are related in an arcuate configuration such that end portions 44, 48 are disposed below middle portion 46 when viewing track 12 in a retracted position shown in FIG. 1. Track 12 includes a pair of parallel integral arm portions 52 (only one of which is shown) extending forward and slightly upward from forward portion 44. Track arms 52 pivotally engage slat arm 16 by means of pivot connector 14. Slat 11 includes an upper surface 64 and a lower surface 66 which terminate together at a leasing edge 68. A rear surface 67 of slat 11 extends primarily upward and then primarily rearward from lower surface 66 to define a concave surface which terminates together with upper surface 64 at trailing edge 19. Rear surface 67 defines a recessed area for receipt of wing fixed leading edge 28 and a portion of wing upper surface 20 therein when slat 11 is in the retracted position. Slat 11 is mounted to an additional drive track (not shown), located spanwise from track 12, which is substantially similar to main track 12 and which provides additional support for slat 11.

Figure 2:
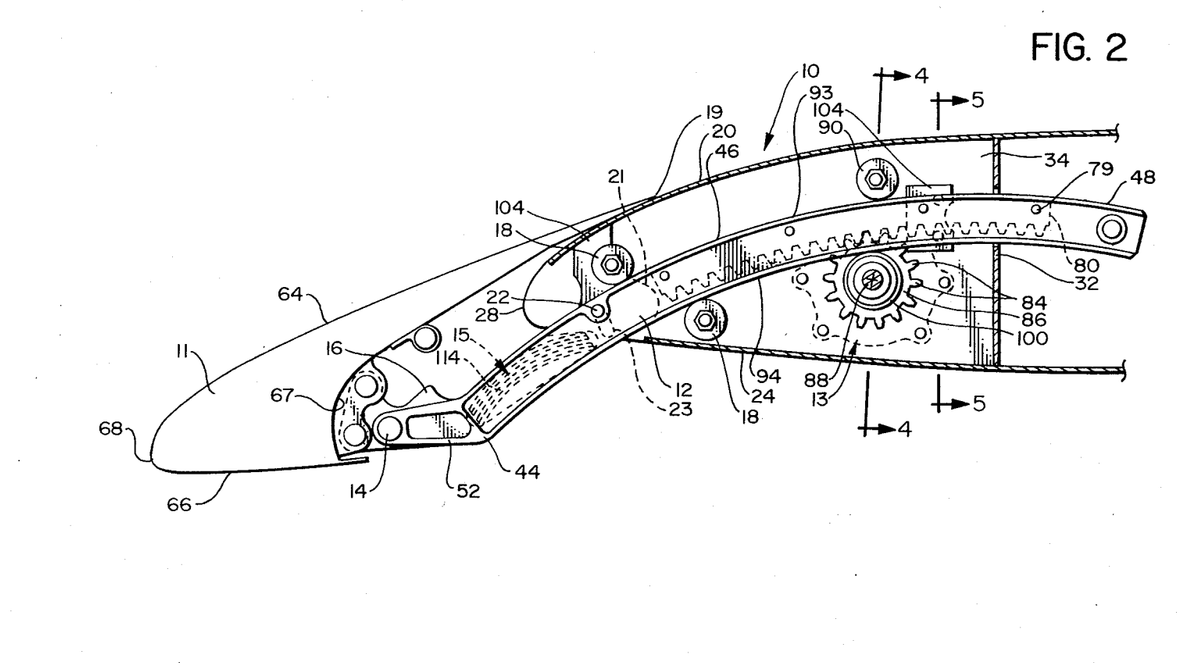
FIG. 2 is a side sectional view of the aircraft wing, taken along the same section as the view in FIG. 1, and showing the slat in an intermediate position between an extended and retracted position.
Figure 3:
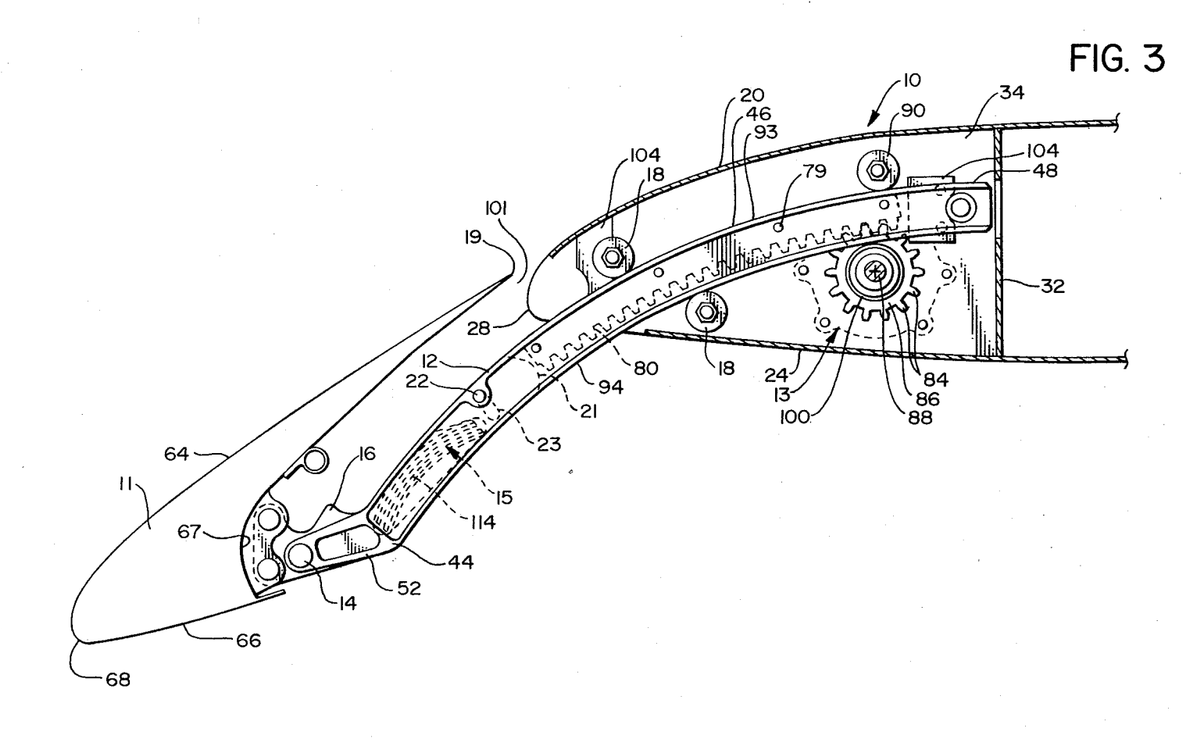
FIG. 3 is a side sectional view of the aircraft wing, taken along the same section as the view in FIG. 1, and showing the slat in a first extended position.

Slat 11 is extended by actuator 13 and main track 12 between the retracted position shown in FIG. 1, where slat upper surface 64 is aligned with a rearward portion of wing upper surface 20, and leading edge 28 is located within the slat recess; through an intermediate position shown in FIG. 2 where leading edge 68 is moved forward and downward relative to wing fixed leading edge 28; and an extended position, shown in FIG. 3, where slat leading edge 68 is moved further forward and downward relative to the intermediate position shown in FIG. 2.

Figure 4:
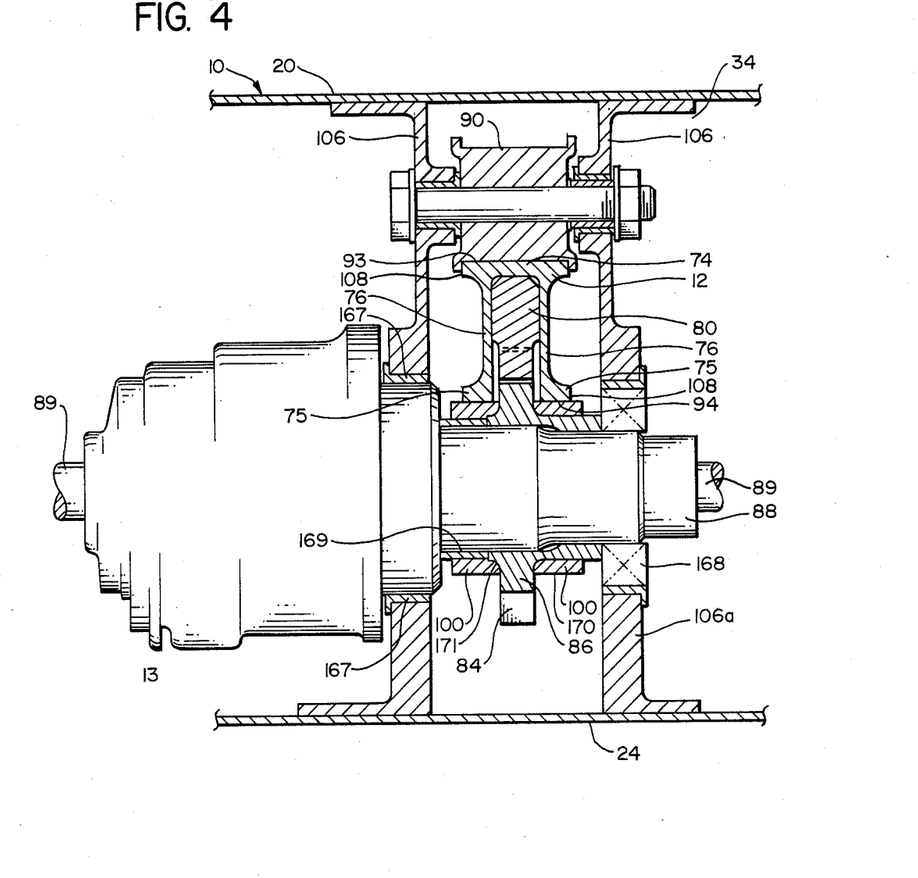
FIG. 4 is a front view, taken along lines 4—4 of FIG. 2, showing in section, a support track and roller assembly, driven by rack and pinion gears with a rotary actuator shown in phantom.

As shown in FIG. 4, track 12 has a slotted I-beam cross-sectional configuration formed by an upper horizontal flange 74, a pair of lower horizontal flanges 75, and a pair downwardly depending parallel webs 76 which are integrally connected between flanges 74, 75. Depending downward from flange 74 and fixedly attached to track 12 by fasteners 79 is a gear rack 80 which is disposed in a chordwise direction along track 12. Gear rack 80 is adapted to receive teeth 84 which extend radially outward from a pinion gear 86 of rotary actuator 13 so that rotation of pinion gear 86 drives track 12 to reposition slat 11 between the retracted and extended positions. Pinion 86 is driven by a low speed drive shaft 88 from a speed reducing rotary actuator 13 which in turn is driven by a high speed shaft 89 passing though actuator 13 and shaft 88.

Referring to FIGS. 1 and 4 together, in order to support main track 12 during chordwise movement, track 12 is engaged at a leading edge portion of wing 10 between rollers 18, and at a rearward portion of wing 10 between an upper roller 90, and roller rings 100 in a manner to be discussed in greater detail hereinafter. Rollers 18 are rotatably connected to wing 10 and engage main track 12 at an upper surface 93 and lower surface 94. Likewise, main track 12 is engaged by roller 90 and roller rings 100 (FIG. 4) at its respective upper, lower surfaces 93, 94. Roller rings 100 are rotatably mounted about drive shaft 88 at a location below roller 90.

Figure 5:
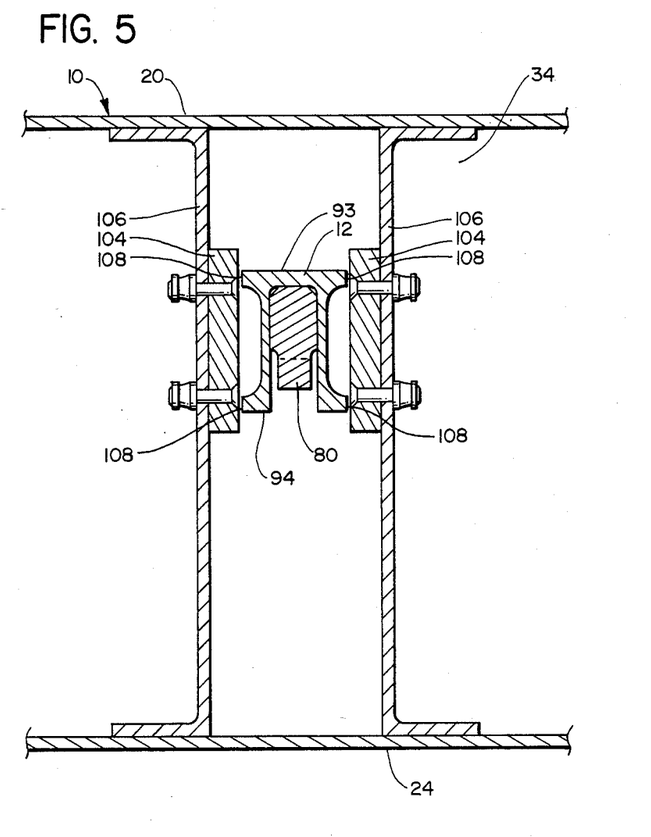
FIG. 5 is a front sectional view of the aircraft wing, taken along lines 5—5 of FIG. 2, and showing the slat support track and drive gear rack attached to the side of the aircraft wing leading edge ribs.

As shown in FIGS. 1 and 5, in order to support drive track 12 in a spanwise direction, side load pads 104 are mounted on opposing inner surfaces of adjacent ribs 106 which extend vertically between upper surface 20 and lower surface 24, and which extend chordwise across wing cavity 34. Pads 104 engage side surfaces 108 of track 12 to allow slideable movement of track 12 in a general chordwise direction, while supporting track 12 in a spanwise direction.

Figure 6:
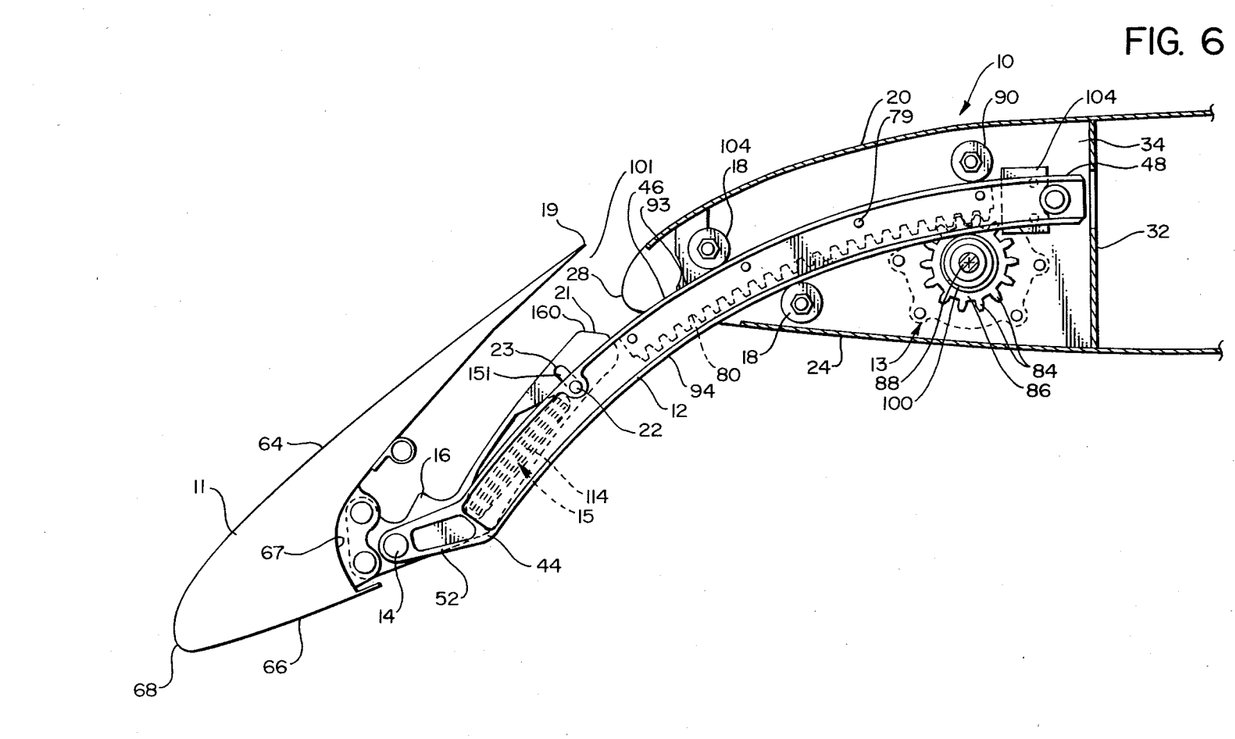
FIG. 6 is a side sectional view of the aircraft wing, taken along the same section as the view in FIG. 1, and showing the slat in a second extended position where the slat leading edge has rotated about a pivot on the support track from the first extended position to a second extended position having a larger aerodynamic slot to achieve an increased lift configuration.

To maintain the aerodynamic lift of the wing during landing, slat 11 is moved to the first extended position shown in FIG. 3, where slat 11 becomes pivotable about pivot connector 14 in a counterclockwise direction (as viewed in FIG. 3) from the first extended position to the second extended higher lift position shown in FIG. 6. During rotation to the second extended position, slat leading edge 68 moves further downward and rearward, and slat trailing edge 19 moves further upward and forward, relative to the first extended position shown in FIG. 3, so that the distance between slat trailing edge 19 and wing upper surface 20, defined by a slot 101, is increased. Movement of slat 11 between the first extended position and the second extended position is achieved by an aerodynamic pressure distribution acting in a positive upward direction on the slat surfaces so that the slat is caused to rotate about pivot 14 to open aerodynamic slot 101 and admit high energy air to prevent flow separation on the wing upper surface during conditions of high angle of attack. Whereas, however, when the angle of attack decreases, the force distribution on the slat shifts in a manner to cause slat 11 to pivot in a clockwise direction, when viewing FIG. 3, about pivot connector 14 toward the first extended position.

It is desirable, however, to program the amount of pivotal rotation of slat 11 about pivot connector 14, between the first extended position and the second extended position as a function of the aerodynamic forces acting on slat 11. The amount of pivotal rotation is controlled by biasing means 15, in a manner that as the aerodynamic forces on slat 11 increase, slat 11 pivots in a counterclockwise direction, when viewing FIG. 3, against biasing means 15. The amount of pivotal rotation of slat 11 toward the second position increases by an amount proportional to these aerodynamic forces.

Figure 7:
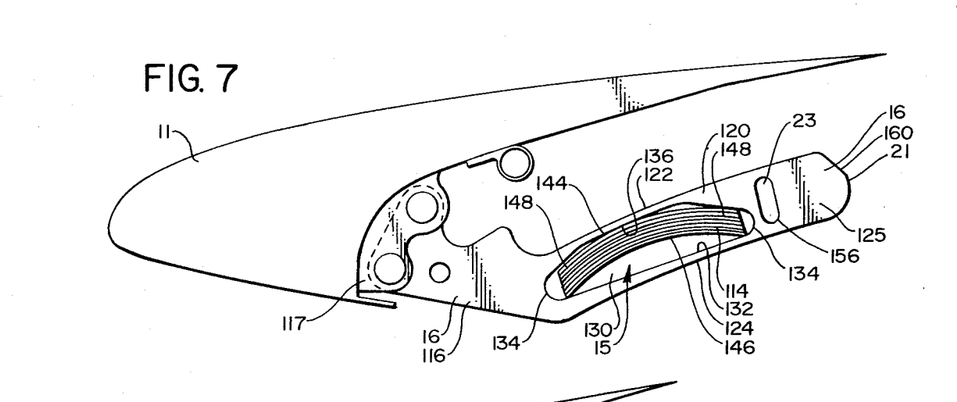
FIG. 7 is a side view of the slat, including a slat arm which extends rearward from the slat and which contains spring biasing means.
Figure 8:
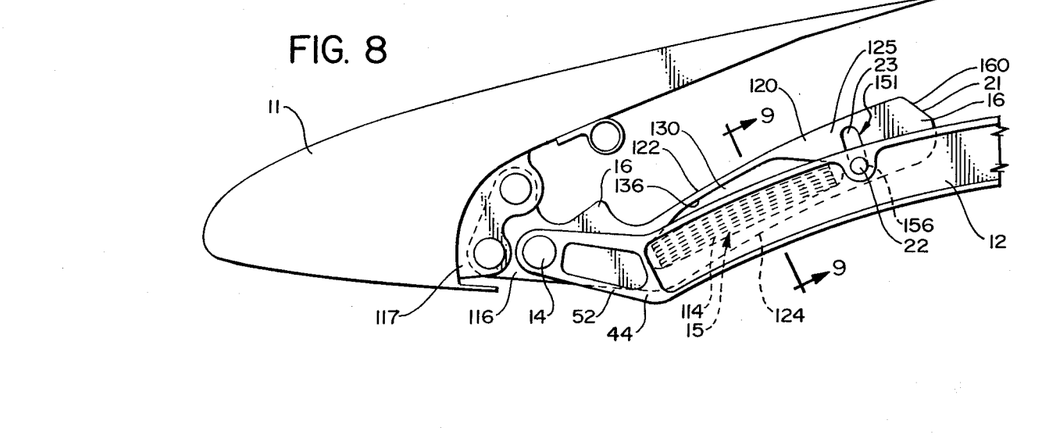
FIG. 8 is a side view of the slat, biasing arm, and spring biasing means, wherein the slat is shown in the second extended position as a result of aerodynamic forces overcoming the spring bias.
Figure 9:
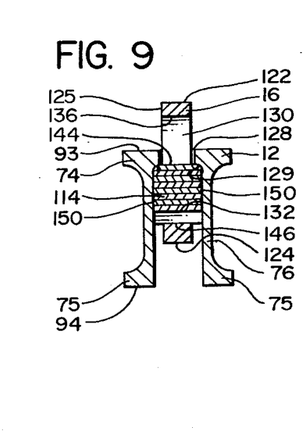
FIG. 9 is a front sectional view, taken along lines 9—9 of FIG. 8, of the main support track and slat biasing arm, showing the spring biasing means compressed between the support track and the slat arm when the slat is in the second extended position.

In a preferred embodiment, biasing means 15 is a leaf spring assembly 114 which is engaged between main track 12 and slat biasing arm 16 in a manner shown more clearly in FIGS. 7 through 9. Slat arm 16 includes a first elongated portion 116 extending rearward from a mounting flange 117 connected to a rear portion of slat 11. Slat arm 16 also includes a second elongated portion 120 extending integrally upward and rearward from first portion 116, and having an upper surface 122, a lower surface 124 and side surfaces 125 extending vertically therebetween.

To bias slat 11 towards the first extended position, upper flange 74 (FIG. 9) of main track 12 includes a slot 126 extending vertically between upper surface 93 and a lower surface 129 of upper flange 74. Slot 128 extends (i) chordwise along drive track 12 from a location somewhat forward of track mid-portion 46 (FIG. 1), through track forward portion 44, arm portion 52 and pivot connector 14, and (ii) spanwise a predetermined distance which is slightly greater than the width of slat arm 16 defined by the spanwise distance between side surfaces 125 (FIG. 7). To contain leaf spring assembly 114, slat arm 16 includes an elongated cavity 130 having a lengthwise axis extending chordwise along rear portion 120. Cavity 130 is formed by (i) a relatively flat lower surface 132 extending between U-shaped ends 134 of slot 130 and (ii) an upper surface which slants upwardly and inwardly from ends 134 to a relatively flat surface 136.

In a preferred embodiment, biasing means 15 is formed by a plurality of elongated resilient graphite epoxy composite members which are oriented along the chordwise axis of cavity 130 to form spring assembly 114 having an upper surface 144, a lower surface 146 and ends 148. Spring assembly 114 curves upward from its ends 148 so that a middle portion of the spring upper surface 144 engages upper surface 136 of cavity 130.

Referring to FIG. 9, spring assembly 114 includes opposing side surfaces 150 extending vertically between spring upper surface 144 and spring lower surface 146. Side surfaces 150 define a spanwise width of spring 114 which is greater than the spanwise width of track slot 128 so that during movement of slat 11 to the second extended position, slat biasing arm 16 pivots in a counterclockwise direction when viewing FIG. 8, to compress spring 114 between lower surface 129 (FIG. 9) of track flange 74 and cavity lower surface 132 of biasing arm 16. However, when the aerodynamic pressure distribution acting on slat 11 is insufficient to overcome the bias of spring 114, the biasing action of spring 114 urges slat 11 toward a position wherein upper surface 122 of slat arm 16 is generally aligned with upper surface 93 of drive track 12, and lower surface 124 of slat arm 16 is generally aligned with lower track surface 94.

Movement of slat 11 to the second extended position is limited by a limiting means indicated at 151, (FIG. 8) which includes stop pin 22 extending spanwise through track 12 to engage a somewhat vertical elongated slot 23 of slat arm 16. Slot 23 includes a lower end 156 which engages stop pin 22 to prevent further rotation of slat 11 toward the second extended position, and thus determines the maximum size of slot 101 (FIG. 6).

Operation of the slat apparatus of the present invention from the retracted position is initiated by counterclockwise rotation of rotary actuator 13 (FIG. 1) which causes track 12 and slat 11 to move downward and forward in a manner that slat trailing edge 19 slides over wing upper surface 20. As slat 11 moves downward and forward, upper, lower surfaces 122, 124 of slat arm 16 (FIG. 9) are generally aligned with upper, lower surfaces 93, 94, respectively, of main track 12 by the "sandwiching" action of support rollers 18 which provide a spanwise surface to simultaneously engage track, slat upper surfaces 93, 122 and lower surfaces 94, 124. It is desirable that slat trailing edge 19 remain engaged against wing upper surface 20 when slat 11 is in the intermediate position shown in FIG. 2, typically a configuration for take-off operation, and a configuration where deployment of slat 11 to the second higher lift position would be undesirable. Therefore slat arm 16 (FIG. 2) extends a sufficient distance upward and rearward from slat 11 so that when slat 11 is in the intermediate position, support rollers 18 engage slat arm upper surface 122 to align and lock it in conjunction with slat limit means 151 (FIG. 3) to drive track 12.

As slat 11 is extended forward from the intermediate position, slat biasing arm 16 is disengaged from support rollers 18; however, slat arm 16 is urged into general alignment with main track 12 by the biasing action of spring 114. As the wing angle of attack increases causing the aerodynamic force distribution on the slat to overcome the biasing action of spring 114, slat 11 pivots toward the second higher lift extended position thereby increasing the size of slot 101, (FIG. 6) and improving the highlift capabilities of the wing 10. As the wing angle of attack is further increased, slat 11 pivots further toward the second extended position until prevented from further pivotal movement by slat limit means 151 thereby defining a predetermined sized slot 101 to prevent the airflow over the wing leading edge from separating and thereby achieving efficient highlift operation. It should be appreciated that the position of slat 11, once extended forward of the intermediate position, is a function of the aerodynamic force acting on the slat, the bias force exerted by biasing means 15 and opposing aerodynamic forces, as well as the amount of forward extension of main track 12. However, rotation of slat 11 toward the second extended position (i) occurs without the need for additional auxiliary tracks to position slat 11 in the desired highlift configuration, and, (ii) results in the positioning of slat 11 in a manner which responds rapidly to changes in the angle of attack.

Upon retraction of slat 11, drive track 12 moves upward and rearward to a location where slat arm 16 is once again engaged by forward rollers 18. Slat arm 16 includes a rear edge (FIG. 6) which slants downward and rearward from slat arm upper surface 122 to form an inclined surface 160 which is engaged by forward upper support roller 18 to gradually align biasing arm 16 with main track 12 during retraction.

As discussed previously, main track 12, in a preferred embodiment of the present invention, is supported by roller rings 100 (FIG. 4) which are rotatably mounted to rotating actuator 13. Rotary actuator 13, driven by high speed shaft 89, is supported by bushing 167 installed in rib 106. The rotary actuator low speed output drive shaft 88, which is supported radially by rib 106a through bearing 168, rotates pinion gear 86. In order to support main track 12, teflon lined roller rings 100 are mounted on the hub shoulders 171 of pinion gear 86. An outer surface 170 of support ring 100 contacts main track lower surface 94. Due to the differential speed between track lower surface 94 and rotary actuator 13, the inner surface 169 of support ring 100 has a teflon anti-friction surface to allow the roller rings 100 to rotate freely on the hub shoulders of pinion gear 86 and to roll on track 42 without slippage.

Conventionally, main track 12 was supported by a fourth roller (not shown) similar in configuration to rollers 18, 90 (FIG. 1). This fourth roller was located rearward of upper roller 90 and below main track 12. The rearward location of the fourth roller necessitated that rotary actuator 13 be located downward and forward of the location it presently occupies in FIG. 1, since the furthest rearward location of the fourth roller was limited by the location of front spar 32. The downward and forward location of rotary actuator 13 necessitated that wing cavity 34 have a greater vertical distance between upper wing surface 20 and lower wing surface 24 than is needed in the present invention in order to accommodate the downwardly located rotary actuator 13. The present invention, however, eliminates the fourth roller and utilizes roller rings 100 to support the main track 12 at the rear portion of wing cavity 34. Incorporation of roller rings 100 and elimination of the fourth roller, allows rotary actuator 13 to be located upward and rearward relative to the location it occupied conventionally, thereby allowing for a reduction in the vertical cross-sectional dimension of wing cavity 34.

Other embodiments not disclosed herein, but which are emcompassed within the spirit and scope of the present invention as described herein are also included as part of the present application.

What is claimed is:

1. In a wing having a forward leading edge and a rear trailing edge, a leading edge slat apparatus comprising:
   a. a slat mounted to said wing for movement between a first stowed location in said wing and a second outwardly extended deployed location, said slat having a leading edge, a trailing edge and a biasing arm;
   b. a mounting track to which said slat is mounted, said mounting track being movably mounted to said wing so as to move said slat between the first and second locations, said mounting track including a slot which extends between first and second opposing surfaces of said mounting track, and which is adapted to receive said biasing arm for movement therewithin along a first axis when the slat moves between the first and second locations;
   c. said slat having at said second location a first position wherein the trailing edge of the slat is closer to the wing, and a second position where a trailing edge of the slat is spaced further away from the wing;
   d. said slat being further characterized in that at the second location aerodynamic pressure distributions acting on the slat generate forces which tend to move the slat toward the second position, with the forces increasing with greater angle of attack of the airfoil;
   e. spring means operatively connected between the slat and the track to move the slat toward the first position whereby at low airfoil angles of attack the slat occupies the first position and at higher angles of attack the slat is moved toward the second position; and
   f. said biasing arm further including a cavity defined by first and second opposing inner surfaces of the biasing arm for engaging first and second opposing surfaces of the spring means, respectively, therebetween, in a manner that the first surface of the spring means also engages the second surface of the mounting track so that movement of the slat toward the second position causes the biasing arm to move within the slot along the first axis so that the spring means is compressed between the second surface of the biasing arm cavity and the second surface of the mounting track.

2. The leading edge slat apparatus as set forth in claim 1 wherein:
   a. said mounting track is supported by guide members which rotatably engage the mounting track to allow movement of the mounting track in a generally chordwise direction when the slat is moved between said first and second locations; and
   b. said biasing arm is engaged by at least one of the guide members during movement with the mounting track in the generally chordwise direction to prevent movement of the slat toward the second position until the slat has moved beyond an intermediate location between the first stowed location and the second outwardly extending location where the biasing arm is no longer engaged by the guide member.

3. In a wing having a forward leading edge and a rear trailing edge, a leading edge slat apparatus comprising:
   a. a slat mounted to the wing for movement between a first stowed location in the wing and a second outwardly extending deployed location, the slat having a leading edge, a trailing edge and a biasing arm;

b. a mounting track to which the slat is mounted, the mounting track being movably mounted to the wing so as to move the slat between the first and second locations, the mounting track being supported by guide members which are operatively connected to the wing and which allow movement of the slat between the first and second locations;

c. said slat having at the second location a first position wherein the trailing edge of the slat is closer to the wing, and a second position wherein the trailing edge of the slat is spaced further away from the wing;

d. said slat being further characterized in that at the second location aerodynamic pressure distributions acting on the slat generate forces which tend to move the slat toward the second position, with the forces increasing with greater angles of attack of the airfoil; and e. biasing means operatively connected between the slat and the track to move the slat towards the first position whereby at low airfoil angles of attack the slat occupies the first position and at higher angles of attack the slat is moved towards the second position; and f. at least one of the guide members engage the biasing arm to prevent movement of the slat toward the second position until the slat has moved beyond an intermediate location which is between the stowed location and the outwardly extending location, and where the biasing arm is no longer engaged by the guide members.

4. In a wing having a forward leading edge and a rear trailing edge, a leading edge slat apparatus comprising:

a. a slat mounted to the wing for movement between a first stowed location at the wing and a second outwardly extending deployed location, the slat having a leading edge and a trailing edge;

b. a mounting track to which the slat is mounted, the mounting track being movably mounted to the wing so as to move the slat between the first and second locations;

c. a gear member which is engaged to the mounting track for driving the mounting track to reposition the slat between the stowed and the extended positions, the gear member including a shoulder portion which is located beneath the mounting track, the gear member further including a roller member which freely rotates on the shoulder portion and which rotatably engages the mounting track to support the mounting track during movement of the track;

d. the slat having at the second location a first position wherein the trailing edge of the slat is closer to the wing, and a second position wherein the trailing edge of the slat is spaced further away from the wing:

e. the slat being further characterized in that at the second location aerodynamic pressure distributions acting on the slat generate forces which tend to move the slat toward the second position, with the forces increasing with greater angles of attack of the airfoil; and f. biasing means operatively connected between the slat and the track to move the slat toward the first position whereby at low airfoil angles of attack the slat occupies the first position and at higher angles of attack the slat is moved toward the second position.

5. A wing edge slat apparatus comprising:

a. a slat mounted to the wing for movement between a first stowed location at the wing and a second outwardly extended deployed location, the slat having a leading edge, a trailing edge and a rearwardly extending biasing arm;

b. a mounting track to which the biasing arm is connected at a first pivot location to permit pivotal movement of the slat about the first pivot location, the mounting track being movably mounted to the wing in a manner that the mounting track is supported between guide members which are connected to the wing and which engage the mounting track for movement of the mounting track between the first and second locations;

c. the slat being rotatable about the first pivot location at the second location between (i) a first lower lift position, and (ii) a second higher lift position where the slat leading edge is positioned downward of the lower lift position;

d. the slat being further characterized in that at the second position aerodynamic pressure distributions acting on the slat generate forces which tend to rotate the slat about the first pivot location toward the second position;

e. biasing means for urging the slat toward the first position whereby at low wing angles of attack the slat occupies the first position and at higher angles of attack the slat is moved toward the second position, the biasing means being engaged between the biasing arm and the mounting track, at a location rearward of the first pivot location to urge the slat toward the first position and to permit movement of the slat toward the second position in an amount which is the function of the aerodynamic pressure distributions; and f. the biasing arm further including a rear portion having a slanted rear edge which engages at least one of the guide members during movement of the slat from the extended location to the stowed location to cause the biasing arm rear portion to generally align in a lengthwise manner with the mounting track.

6. A wing edge slat apparatus comprising:

a. a slat mounted to the wing for movement between a first stowed location at the wing and a second outwardly extended deployed location, the slat having a leading edge, a trailing edge and a rearwardly extending biasing arm;

b. a mounting track to which the biasing arm is connected at a first pivot location to permit pivotal movement of the slat about the first pivot location, the mounting track being movably mounted to the wing so as to move the slat between the first and second locations, the mounting track being further supported between guide members which are connected to the wing and which engage the mounting track for movement of the mounting track in a generally chordwise direction when the slat is moved between the first and second locations;

c. said slat being rotatable about the first pivot location at the second location between (i) a first lower lift position, and (ii) a second higher lift position where the slat leading edge is positioned downward of the lower lift position;

d. said slat being further characterized in that at the second position aerodynamic pressure distributions acting on the slat generate forces which tend to rotate the slat about the first pivot position toward the second pivot position; and e. biasing means for urging the slat toward the first position whereby at low angles of attack the slat occupies the first position and at higher angles of attack the slat is moved toward the second position, the biasing means being engaged between the biasing arm and the mounting track, respectively, at locations rearward of the first pivot location to urge the slat toward the first position and to permit movement of the slat toward the second position in an amount which is a function of the aerodyanamic pressure distributions, the biasing means being engaged between the biasing arm and the mounting track in a manner to urge the biasing arm into generally lengthwise alignment with the mounting track at the first position to permit movement of the biasing arm with the mounting track between the guide members when the slat moves between the deployed location and the stowed location.

7. The wing edge slat apparatus as set forth in claim 6 wherein:

a. said biasing arm has an upper surface and a lower surface;

b. said mounting track has an upper surface and a lower surface; and c. said biasing means operates in a manner to urge the biasing arm into generally lengthwise alignment with the mounting track so that the upper surface and lower surface of the biasing arm are aligned with the upper surface and lower surface, respectively, of the mounting track, for engagement by the guide members.

8. The wing edge slat apparatus as set forth in claim 6 wherein said mounting track includes a slot extending between upper and lower surfaces of the mounting track to receive the biasing arm for movement therethrough to permit the lengthwise alignment of the biasing arm and the mounting track.

9. In a wing having a forward leading edge and a rear trailing edge, a leading edge slat apparatus comprising:

a. a slat mounted to the wing for movement between a first stowed location in the wing and a second outwardly extending deployed location, the slat having a leading edge and a trailing edge;

b. a mounting track to which the slat is mounted, the mounting track being movably mounted to the wing so as to move the slat between the first and second locations;

c. a gear member, which is connected to said wing, for driving the mounting track to reposition the slat between the stowed and the extended locations, the gear member including a roller member which is rotatably mounted on the gear member and which rotatably engages the mounting track to support the mounting track during movement of the slat;

d. said slat having at the second location a first position wherein the trailing edge of the slat is closer to the wing, and a second position wherein the trailing edge of the slat is spaced further away from the wing;

e. said slat being further characterized in that at the second location aerodynamic pressure distributions acting on the slat generate forces which tend to move the slat toward the second position, with the forces increasing with greater angles of attack of the airfoil; and f. biasing means operatively connected between the slat and the track to move the slat towards the first position whereby at low airfoil angles of attack of airflow the slat occupies the first position and at higher angles of attack the slat is moved towards the second position.

* * * * *